US012789909B2

(12) United States Patent
Andersson et al.

(10) Patent No.: US 12,789,909 B2
(45) Date of Patent: Nov. 10, 2026

(54) DASHBOARD ASSEMBLY FOR A VEHICLE

(71) Applicant: Volvo Car Corporation, Gothenburg (SE)

(72) Inventors: Johan Andersson, Gothenburg (SE); Patrik Müller, Gothenburg (SE); Clément Alliot, Gothenburg (SE); Zhuohang Liao, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 256 days.

(21) Appl. No.: 18/611,011

(22) Filed: Mar. 20, 2024

(65) Prior Publication Data

US 2024/0317317 A1 Sep. 26, 2024

(51) Int. Cl.

*B62D 25/14* (2006.01)
*B60H 1/00* (2006.01)
*B60K 35/22* (2024.01)

(52) U.S. Cl.

CPC ......... *B62D 25/142* (2013.01); *B60H 1/0055* (2013.01); *B60K 35/22* (2024.01)

(58) Field of Classification Search

CPC .. B60H 1/0055; B60H 1/00564; B60K 35/22; B62D 25/142
USPC ...................................... 296/70, 190.09, 208
See application file for complete search history.

(56) References Cited

U.S. PATENT DOCUMENTS 6,688,680 B1 * 2/2004 Cooper ................ B62D 27/023 296/70
6,705,672 B2 * 3/2004 Shikata .............. B60H 1/00528 296/70
6,877,787 B2 * 4/2005 Ito ........................ B62D 25/142 296/70

(Continued)

FOREIGN PATENT DOCUMENTS

CN 112060907 A 12/2020
FR 2895355 A1 * 6/2007 ........... B62D 29/004

(Continued)

OTHER PUBLICATIONS

English translation of FR 2 895 355; retrieved via Patent Translate located at www.epo.org. (Year: 2026).*

(Continued)

*Primary Examiner* — Jason S Daniels
(74) *Attorney, Agent, or Firm* — Davé Law Group, LLC; Raj S. Davé

(57) ABSTRACT

According to an embodiment, it is a dashboard assembly for a vehicle, comprising a dashboard body extending at least along a width direction, wherein in a state in which the dashboard body is mounted in the vehicle, the width direction extends in parallel to a width direction of the vehicle, and at least one ventilation module, comprising an air duct ending in an air outlet being configured to discharge air into a passenger compartment of the vehicle, wherein at least one body-sided mounting surface with a body-sided connection feature is arranged on the dashboard body, the body-sided mounting surface facing into the width direction, and (Continued)

wherein the at least one ventilation module abuts against the body-sided mounting surface and is connected to the dashboard body using the body-sided connection feature.

16 Claims, 1 Drawing Sheet

(56) References Cited

U.S. PATENT DOCUMENTS

| | | | | |
|---|---|---|---|---|
| 7,044,538 | B2 * | 5/2006 | Stack | B60H 1/0055 296/70 |
| 7,963,589 | B2 * | 6/2011 | Baudart | B62D 25/145 296/70 |
| 8,641,134 | B2 * | 2/2014 | Sawyer | B60H 1/00564 454/142 |
| 2016/0039270 | A1 | 2/2016 | Sawada et al. | |
| 2019/0047377 | A1 | 2/2019 | Tanaka et al. | |

FOREIGN PATENT DOCUMENTS

| | | | | |
|---|---|---|---|---|
| GB | 2535764 A * | 8/2016 | | B60H 1/242 |
| KR | 102436283 B1 | 8/2022 | | |

OTHER PUBLICATIONS

Search report issued for EP Application No. 23162905.6, mailed on Oct. 27, 2023, 7 pages.

* cited by examiner

DASHBOARD ASSEMBLY FOR A VEHICLE

CROSS-REFERENCE TO RELATED APPLICATIONS

This application claims the benefit of European Patent Application Number 23162905.6, filed on Mar. 20, 2023, which is hereby incorporated by reference in its entirety.

FIELD OF INVENTION

The present disclosure relates to a dashboard assembly for a vehicle.

BACKGROUND

There is a need to simplify known dashboard assemblies from a structural perspective and from the perspective of assembly. This means that there is a need for a dashboard assembly which is structurally simple, and which can be assembled in a simple manner.

SUMMARY

The present disclosure relates to a dashboard assembly for a vehicle. The dashboard assembly comprises a dashboard body extending at least along a width direction, wherein in a state in which the dashboard body is mounted in the vehicle, the width direction extends in parallel to a width direction of the vehicle.

Furthermore, the present disclosure relates to a ventilation module for such a dashboard assembly, to a dashboard body for such a dashboard assembly, to a side cover part for such a dashboard assembly, and to a central cover part for such a dashboard assembly.

Additionally, the present disclosure is directed to a method for assembling a dashboard assembly for a vehicle.

Dashboard assemblies comprising a dashboard body, one or more ventilation modules and one or more cover parts are known.

It is an objective of the present disclosure to simplify known dashboard assemblies. In this context, known dashboard assemblies shall be simplified from a structural perspective and from the perspective of assembly. This means that a dashboard assembly shall be provided which is structurally simple and which can be assembled in a simple manner.

The problem is at least partially solved or alleviated by the subject matter of the independent claims of the present disclosure, wherein further examples are incorporated in the dependent claims.

According to a first aspect, there is provided a dashboard assembly for a vehicle. The dashboard assembly comprises a dashboard body extending at least along a width direction. In a state in which the dashboard body is mounted in the vehicle, the width direction extends in parallel to a width direction of the vehicle. The dashboard assembly also comprises at least one ventilation module. The ventilation module comprises an air duct ending in an air outlet being configured to discharge air into a passenger compartment of the vehicle. At least one body-sided mounting surface with a body-sided connection feature is arranged on the dashboard body. The body-sided mounting surface faces into the width direction. The at least one ventilation module abuts against the body-sided mounting surface and is connected to the dashboard body using the body-sided connection feature. In this context, the width direction is the direction of the biggest extension of the dashboard body and the dashboard assembly. It is understood that the dashboard body also extends along a height direction and along a depth direction. In a state in which the dashboard body is mounted in the vehicle, a height direction of the dashboard body corresponds to a height direction of the vehicle. Moreover, in the state in which the dashboard body is mounted in the vehicle, the depth direction of the dashboard body extends along a longitudinal direction of the vehicle. The fact that the body-sided mounting surface faces into the width direction means that the biggest component of a normal on the mounting surface extends into the width direction. It is noted that the body-sided mounting surface may comprise a plurality of surface segments. In this case, a normal on a midplane of the plurality of surface segments is used in order to assess whether the body-sided mounting surface faces into the width direction. Thus, in a state in which the dashboard assembly is mounted in the vehicle, the at least one ventilation module abuts against the body-sided mounting surface face along the width direction. An alternative term for a ventilation module is ventilation cassette. Abutting the at least one ventilation module against the body-sided mounting surface and connecting the at least one ventilation module to the body-sided connection feature is structurally simple. Comparatively few parts are necessary. Moreover, abutting the at least one ventilation module against the body-sided mounting surface along a width direction renders the assembly of the dashboard assembly simple.

In the present disclosure, the term body-sided refers to a feature or element of the dashboard body.

In an example, the body-sided mounting surface comprises a body-sided positioning feature. The ventilation module engages the body-sided positioning feature. The positioning feature has the effect that the ventilation module may be abutted against the body-sided mounting surface in one single well-defined position only. The well-defined position comprises a translatory position and a rotatory position of the ventilation module with respect to the dashboard body. This facilitates the assembly of the dashboard assembly. Moreover, since the positioning feature is provided on the body-sided mounting surface, very few parts are necessary.

According to an example, the dashboard body comprises a bezel portion being located adjacent to the ventilation module. In this context, a bezel portion is to be understood as a portion of the dashboard body at least partially delimiting the ventilation module, especially the air outlet. Consequently, in a dashboard assembly according to the present disclosure, the air outlet has an optical appearance which is similar to known air outlets. Thus, for a user of the dashboard assembly or a vehicle in which the dashboard assembly is installed, the optical appearance is familiar and pleasant. However, especially in contrast to known dashboard assemblies, the bezel portion is formed as an integral portion of the dashboard body. This means that the bezel portion is not formed as a separate part. This renders the dashboard assembly structurally simple and facilitates its assembly.

In an example, the dashboard assembly further comprises a side cover part being arranged at an end of the dashboard body when regarding the width direction. At least one side cover-sided mounting surface with a side cover-sided connection feature is arranged on the side cover part. The side cover-sided mounting surface faces into the width direction. The at least one ventilation module abuts against the side cover-sided mounting surface and is connected to the side cover part using the side cover-sided connection feature. As before, the fact that the side cover-sided mounting surface faces into the width direction means that the biggest component of a normal on the mounting surface extends into the width direction. It is noted that the side cover-sided mounting surface may comprise a plurality of surface segments. In this case, a normal on a midplane of the plurality of surface segments is used in order to assess whether the side cover-sided mounting surface faces into the width direction. Consequently, the ventilation module is sandwiched between a portion of the dashboard body and a portion of the side cover part. It is emphasized that the side cover part and the dashboard body are separate parts. Optionally, a portion of the side cover part is connected to the dashboard body in a direct manner, i.e., not via the ventilation module. Thus, when assembling the dashboard assembly, not only the ventilation module can be abutted against the dashboard body along the width direction, but also the side cover part can be abutted against the ventilation module along a width direction. It is noted that of course, different assembly orders are possible. For example, the side cover part may first be connected to the ventilation module and then the sub-assembly of the ventilation module and the side cover part may be connected to the dashboard body. In all variants, assembling the dashboard assembly is simple.

In the present disclosure, the term side cover-sided refers to a feature or element of the side cover part.

In an example, the side cover-sided mounting surface comprises a side cover-sided positioning feature. The ventilation module engages the side cover-sided positioning feature. The side cover-sided positioning feature has the effect that the ventilation module may be abutted against the side cover-sided mounting surface in one single well-defined position only. The well-defined position comprises a translatory position and a rotatory position of the ventilation module with respect to the side cover part. This facilitates the assembly of the dashboard assembly. Moreover, since the positioning feature is provided on the side cover-sided mounting surface, very few parts are necessary.

In an example, the side cover part comprises a bezel portion being located adjacent to the ventilation module. As before, a bezel portion is to be understood as a portion of the side cover part at least partially delimiting the ventilation module, especially the air outlet. Consequently, in a dashboard assembly according to the present disclosure, the air outlet has an optical appearance which is similar to known air outlets. Thus, for a user of the dashboard assembly or a vehicle in which the dashboard assembly is installed, the optical appearance is familiar and pleasant. However, especially in contrast to known dashboard assemblies, the bezel portion is formed as an integral portion of the side cover part. This means that the bezel portion is not formed as a separate part. This renders the dashboard assembly structurally simple and facilitates its assembly.

In an example, the dashboard assembly further comprises a central cover part being arranged between the ends of the dashboard body when regarding the width direction. At least one central cover-sided mounting surface with a central cover-sided connection feature is arranged on the central cover part. The central cover-sided mounting surface faces into the width direction. The at least one ventilation module abuts against the central cover-sided mounting surface and is connected to the central cover part using the central cover-sided connection feature. As explained previously, the fact that the central cover-sided mounting surface faces into the width direction means that the biggest component of a normal on the mounting surface extends into the width direction. It is noted that the central cover-sided mounting surface may comprise a plurality of surface segments. In this case, a normal on a midplane of the plurality of surface segments is used in order to assess whether the central cover-sided mounting surface faces into the width direction. Consequently, the ventilation module is sandwiched between a portion of the dashboard body and a portion of the central cover part. It is understood that the central cover part may be arranged at any position of the dashboard body between the ends of the dashboard body along the width direction. It is not necessary that the central cover part is arranged in a geometric middle of the dashboard body. It is emphasized that the central cover part and the dashboard body are separate parts. Optionally, a portion of the central cover part is connected to the dashboard body in a direct manner, i.e., not via the ventilation module. Thus, when assembling the dashboard assembly, not only the ventilation module can be abutted against the dashboard body along the width direction, but also the central cover part can be abutted against the ventilation module along a width direction. It is noted that of course, different assembly orders are possible. For example, the central cover part may first be connected to the ventilation module and then the sub-assembly of the ventilation module and the central cover part may be connected to the dashboard body. In all variants, assembling the dashboard assembly is simple.

In the present disclosure, the term central cover-sided refers to a feature or element of the central cover part.

In an example, the central cover-sided mounting surface comprises a central cover-sided positioning feature. The ventilation module engages the central cover-sided positioning feature. The central cover-sided positioning feature has the effect that the ventilation module may be abutted against the central cover-sided mounting surface in one single well-defined position only. The well-defined position comprises a translatory position and a rotatory position of the ventilation module with respect to the central cover part. This facilitates the assembly of the dashboard assembly. Moreover, since the positioning feature is provided on the central cover-sided mounting surface, very few parts are necessary.

In an example, the central cover part comprises a bezel portion being located adjacent to the ventilation module. As before, a bezel portion is to be understood as a portion of the central cover part at least partially delimiting the ventilation module, especially the air outlet. Consequently, in a dashboard assembly according to the present disclosure, the air outlet has an optical appearance which is similar to known air outlets. Thus, for a user of the dashboard assembly or a vehicle in which the dashboard assembly is installed, the optical appearance is familiar and pleasant. However, especially in contrast to known dashboard assemblies, the bezel portion is formed as an integral portion of the central cover part. This means that the bezel portion is not formed as a separate part. This renders the dashboard assembly structurally simple and facilitates its assembly.

According to a second aspect, there is provided a ventilation module for a dashboard assembly of the present disclosure. The ventilation module comprises an air duct ending in an air outlet being configured to discharge air into a passenger compartment of the vehicle. Moreover, the ventilation module comprises at least one counter-mounting surface with a counter-connection feature. The counter-mounting surface is configured to abut against a mounting surface of a dashboard body, of a side cover part or of a central cover part and the counter-connection feature is configured to engage a connection feature of the mounting surface of the dashboard body, of the side cover part or of the central cover part. Such a ventilation module is structurally simple. This renders the structure of a dashboard assembly in which the ventilation module is used also simple. Moreover, as has already been explained before, using such a ventilation module facilitates the assembly of a dashboard assembly in which it is used.

According to an example, the at least one ventilation module comprises one or more lamellac which are configured for guiding an airstream being oriented towards the air outlet. The lamellae may also be called guiding blades. The lamellae or blades may be used in order to direct an airstream into different directions. For example, one partial airstream may be directed towards a window of the vehicle and another partial airstream may be directed towards a passenger position. The partial airstream being directed towards the window may be used for defrosting the window. Alternatively, or additionally, the lamellae or blades may be adjustable. Thus, when installed in a vehicle, a user of the vehicle may adjust an airstream leaving the air outlet according to his or her preferences.

According to a further example, the ventilation module may comprise two or more air outlets. Each of these air outlets may be configured to direct an airstream into a different direction. For example, one partial airstream may be directed towards a window of the vehicle and another partial airstream may be directed towards a passenger position. The partial airstream being directed towards the window may be used for defrosting the window.

In an example, the ventilation module comprises two counter-mounting surfaces, each having a counter-connection feature, the counter-mounting surfaces being arranged on opposite sides of the ventilation module. Consequently, the ventilation module may be sandwiched between a dashboard body and a side cover part or between the dashboard body and a central cover part. In both alternatives, the ventilation module may be reliably connected to the respective other parts. Consequently, the ventilation module may be mounted within the dashboard assembly in a mechanically stable manner.

According to a third aspect, there is provided a dashboard body for a dashboard assembly of the present disclosure. The dashboard body extends at least along a width direction, wherein in a state in which the dashboard body is mounted in a vehicle, the width direction extends in parallel to a width direction of the vehicle. At least one body-sided mounting surface with a body-sided connection feature is arranged on the dashboard body. The body-sided mounting surface faces into the width direction. Such a dashboard body is structurally simple. This renders the structure of a dashboard assembly in which the dashboard body is used also simple. Moreover, as has already been explained before, using such a dashboard body facilitates the assembly of a dashboard assembly in which it is used.

According to a fourth aspect, there is provided a side cover part for a dashboard assembly of the present disclosure. The side cover part has at least one side cover-sided mounting surface with a side cover-sided connection feature. The side cover-sided mounting surface faces into a width direction when the side cover part is mounted in the dashboard assembly. Such a side cover part is structurally simple. This renders the structure of a dashboard assembly in which the side cover part is used also simple. Moreover, as has already been explained before, using such a side cover part facilitates the assembly of a dashboard assembly in which it is used.

According to a fifth aspect, there is provided a central cover part for a dashboard assembly of the present disclosure. The central cover part has at least one central cover-sided mounting surface with a central cover-sided connection feature. The central cover-sided mounting surface faces into a width direction when the central cover part is mounted in the dashboard assembly. Such a central cover part is structurally simple. This renders the structure of a dashboard assembly in which the central cover part is used also simple. Moreover, as has already been explained before, using such a central cover part facilitates the assembly of a dashboard assembly in which it is used.

In an example, the central cover part comprises a mounting interface for a central infotainment unit. The central infotainment unit may comprise a screen unit. Thus, the central cover part fulfills two functionalities. The first functionality relates to holding the at least one ventilation module and the second functionality relates to mounting the central infotainment unit to the remaining parts of the dashboard assembly. Due to this double functionality, comparatively few parts are necessary.

According to a sixth aspect, there is provided a method for assembling a dashboard assembly for a vehicle. The method comprises:

abutting a ventilation module against a body-sided mounting surface of a dashboard body or a side cover-sided mounting surface of a side cover part by moving the ventilation module and the dashboard body or side cover part relative to one another along a width direction, and connecting the ventilation module to the body-sided mounting surface of the dashboard body or to the side cover-sided mounting surface of the side cover part using a connection feature.

Thus, a mounting direction corresponds to the width direction of the dashboard body. In other words, the ventilation module is stacked on the dashboard body or on the side cover part along the width direction. This is a very simple manner of assembling a dashboard assembly.

According to an example, the method according to the present disclosure is executed in connection with the dashboard assembly of the present disclosure.

In an example, the method further comprises:

abutting an additional ventilation module against a body-sided mounting surface of a dashboard body or a central cover-sided mounting surface of a central cover part by moving the additional ventilation module and the dashboard body or central cover part relative to one another along a width direction, and connecting the additional ventilation module to the body-sided mounting surface of the dashboard body or to the central cover-sided mounting surface of the central cover part using a connection feature.

According to an embodiment, it is a dashboard assembly for a vehicle, comprising a dashboard body extending at least along a width direction, wherein in a state in which the dashboard body is mounted in the vehicle, the width direction extends in parallel to a width direction of the vehicle, and at least one ventilation module, comprising an air duct ending in an air outlet being configured to discharge air into a passenger compartment of the vehicle, wherein at least one body-sided mounting surface with a body-sided connection feature is arranged on the dashboard body, the body-sided mounting surface facing into the width direction, and wherein the at least one ventilation module abuts against the body-sided mounting surface and is connected to the dashboard body using the body-sided connection feature.

According to an embodiment, it is dashboard body comprising a dashboard assembly, wherein the dashboard body extending at least along a width direction, wherein in a state in which the dashboard body is mounted in the vehicle, the width direction extends in parallel to a width direction of the vehicle, and at least one ventilation module, comprising an air duct ending in an air outlet being configured to discharge air into a passenger compartment of the vehicle, wherein at least one body-sided mounting surface with a body-sided connection feature is arranged on the dashboard body, the body-sided mounting surface facing into the width direction, and wherein the at least one ventilation module abuts against the body-sided mounting surface and is connected to the dashboard body using the body-sided connection feature.

According to an embodiment, it is a ventilation module comprising, an air duct ending in an air outlet configured to discharge air into a passenger compartment of the vehicle, and at least one counter-mounting surface with a counter-connection feature, the counter-mounting surface configured to abut against a mounting surface of one or more of a dashboard body, a side cover part, and a central cover part and the counter-connection feature configured to engage a connection feature of one or more of the mounting surface of the dashboard body, the side cover part, and the central cover part; and wherein the ventilation module is configured as a component of a dashboard assembly. The ventilation module further comprises two counter-mounting surfaces, each having a counter-connection feature, the counter-mounting surfaces arranged on opposite sides of the ventilation module.

A side cover part comprising at least one side cover-sided mounting surface with a side cover-sided connection feature, the side cover-sided mounting surface facing into a width direction when the side cover part is mounted in a dashboard assembly.

A central cover part comprising at least one central cover-sided mounting surface (with a central cover-sided connection feature, the central cover-sided mounting surface facing into a width direction when the central cover part is mounted in a dashboard assembly.

According to an embodiment, it is a method for assembling a dashboard assembly for a vehicle, comprising abutting a ventilation module against one or more of a body-sided mounting surface of a dashboard body, and a side cover-sided mounting surface of a side cover part by moving one or more of the ventilation module, the dashboard body, and side cover part relative to one another along a width direction, and connecting the ventilation module to one or more of the body-sided mounting surface of the dashboard body and to the side cover-sided mounting surface of the side cover part using a connection feature.

It should be noted that the above examples may be combined with each other irrespective of the aspect involved.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

The Figures are merely schematic representations and serve only to illustrate examples of the disclosure. Identical or equivalent elements are in principle provided with the same reference signs.

DETAILED DESCRIPTION

Figure 1:
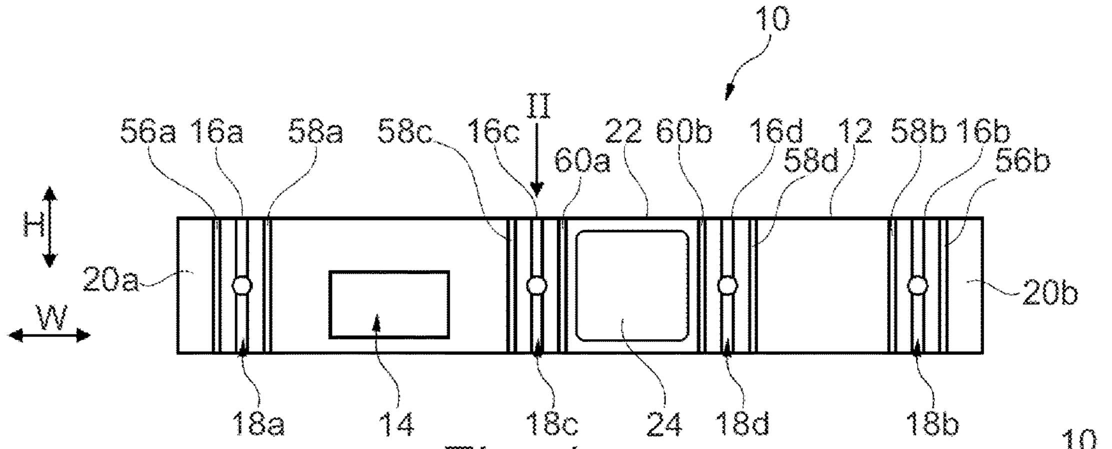
FIG. 1 shows a dashboard assembly according to the present disclosure in a frontal view, wherein the dashboard assembly comprises a dashboard body according to the present disclosure, a central cover part according to the present disclosure, four ventilation modules according to the present disclosure and two side cover parts according to the present disclosure and wherein the dashboard assembly may be assembled using the method according to the present disclosure.

FIG. 1 shows a dashboard assembly 10 for a vehicle in a frontal view. This means that the dashboard assembly 10 is shown as seen when looking along a longitudinal direction of a vehicle if the dashboard assembly 10 is installed in the vehicle.

Consequently, a width direction W of the dashboard assembly 10 extends from left to right in the Figure. This width direction W corresponds to a width direction of a vehicle, if the dashboard assembly 10 is mounted therein.

A height direction H of the dashboard assembly 10 extends in a top-down direction of FIG. 1.

Figure 2:
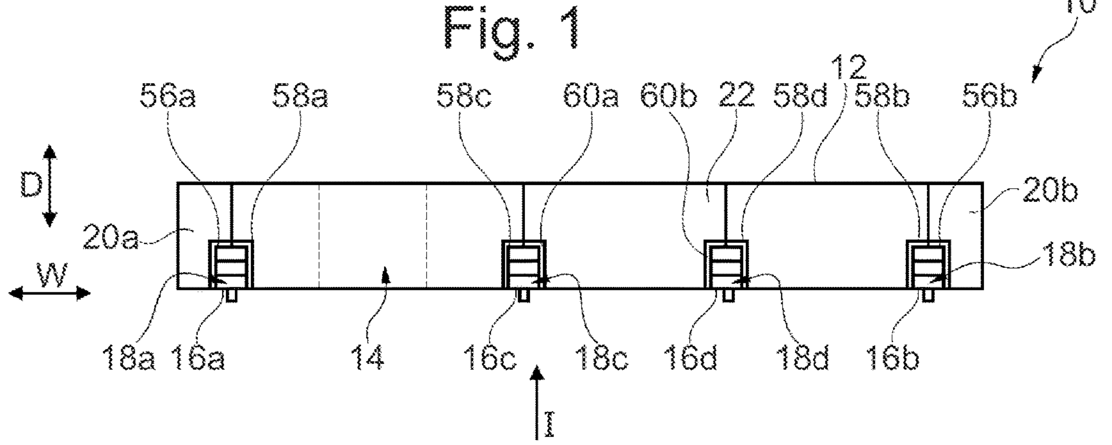
FIG. 2 shows the dashboard assembly of FIG. 1 in a top view along direction II in FIG. 1.

FIG. 2 shows the dashboard assembly 10 along direction II which corresponds to a top view. In other words, in FIG. 2 the dashboard assembly 10 is shown as seen when looking vertically downwards along the height direction H. This height direction H corresponds to a height direction of a vehicle if the dashboard assembly 10 is installed in the vehicle.

A depth direction D of the dashboard assembly 10 extends in a top-down direction of FIG. 2. If the dashboard assembly 10 is installed in a vehicle, the depth direction D corresponds to a longitudinal direction of the vehicle.

The perspective of FIG. 1 is indicated by arrow I in FIG. 2.

The dashboard assembly 10 comprises a dashboard body 12 which extends along the width direction W.

A reception channel 14 is provided in the dashboard body 12. The reception channel 14 is configured to receive a steering column (not shown) if the dashboard assembly 10 is installed in a vehicle.

Moreover, the dashboard assembly 10 comprises a total of four ventilation modules 16*a*, 16*b*, 16*c*, 16*d*.

Each of the ventilation modules 16*a*, 16*b*, 16*c*, 16*d* comprises an air duct ending in an air outlet 18*a*, 18*b*, 18*c*, 18*d* being configured to discharge air into a passenger compartment of the vehicle in which the dashboard assembly 10 may be installed.

Furthermore, the dashboard assembly 10 comprises two side cover parts 20*a*, 20*b* being arranged at an end of the dashboard body 12 respectively when regarding the width direction W.

Additionally, the dashboard assembly 10 comprises a central cover part 22 being arranged between the ends of the dashboard body 12 when regarding the width direction W.

On the central cover part 22, there is arranged a screen unit 24. The screen unit 24 for example forms part of an infotainment system.

Figure 3:
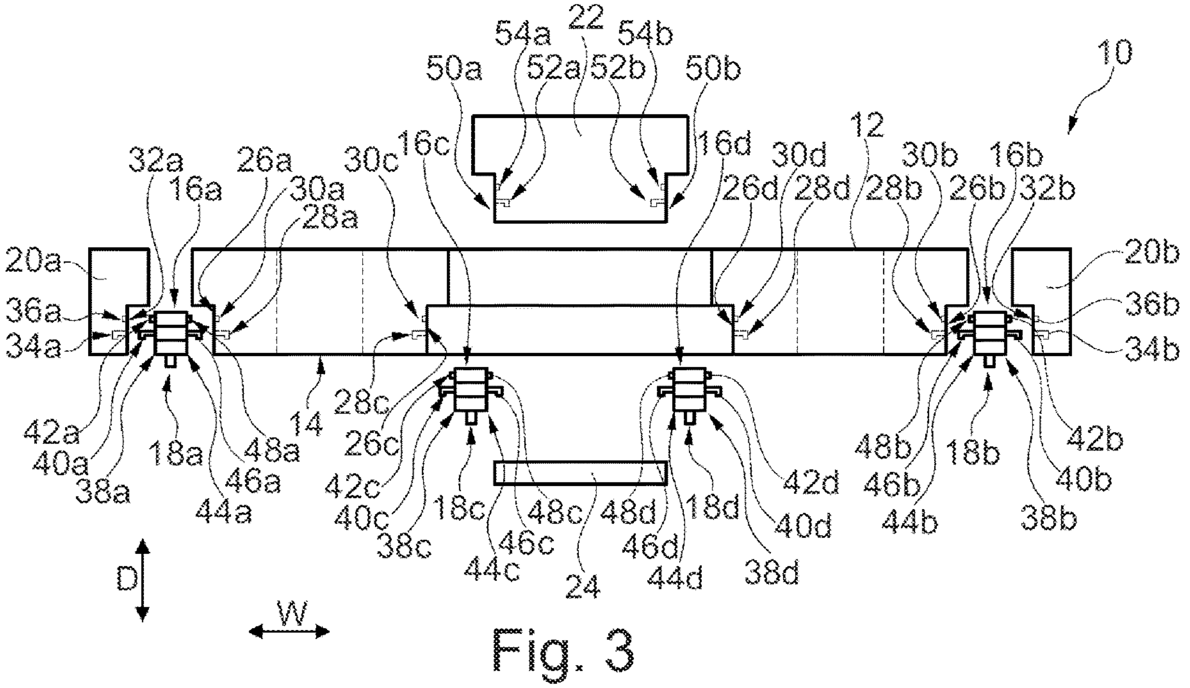
FIG. 3 shows the dashboard assembly of FIGS. 1 and 2 in an exploded view which corresponds to the top view of FIG. 2.

The ventilation module 16*a* is sandwiched between the side cover part 20*a* and the dashboard body 12 (see also FIG. 3).

To this end, a body-sided mounting surface 26*a* with a body-sided connection feature 28*a* and a body-sided positioning feature 30*a* are arranged on the dashboard body 12. The body-sided mounting surface 26*a* faces into the width direction W. In the examples of FIGS. 1 to 3, the body-sided mounting surface 26*a* faces to the left.

Moreover, on the side cover part 20*a*, there is provided a side cover-sided mounting surface 32*a* having a side cover-sided connection feature 34*a* and a side cover-sided positioning feature 36*a*. The side cover-sided mounting surface 32*a* faces into the width direction W. In the Figures, the side cover-sided mounting surface 32*a* of the side cover part 20*a* faces towards the right.

The ventilation module 16*a* comprises a counter-mounting surface 38*a*. The counter-mounting surface 38*a* faces into the width direction W. In the representation of FIGS. 1 to 3, the counter-mounting surface 38*a* faces to the left.

The counter-mounting surface 38*a* comprises a counter-connection feature 40*a* and a counter-positioning feature 42*a*.

In an assembled state of the dashboard assembly 10, the ventilation module 16*a*, more precisely the counter-mounting surface 38*a*, abuts against the side cover-sided mounting surface 32*a* of the side cover part 20*a*.

Moreover, the ventilation module 16*a* and the side cover part 20*a* are mechanically connected via the side cover-sided connection feature 34*a* and the counter-connection feature 40*a*. More precisely, the side cover-sided connection feature 34*a* and the counter-connection feature 40*a* engage each other.

In the example shown in the Figures, the side cover-sided connection feature 34*a* is formed as a connection opening and the counter-connection feature 40*a* is formed as a connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 42*a* and the side cover-sided positioning feature 36*a* of the side cover part 20*a* engage each other.

In the example shown in the Figures, the positioning feature 36*a* is formed as a positioning opening and the counter-positioning feature 42*a* is formed as a positioning protrusion. It is understood that this is just an example, and any other suitable connection features and suitable counter-connection features could be used.

Consequently, the side cover part 20*a* and the ventilation module 16*a* assume a well-defined position relative to one another. Moreover, the side cover part 20*a* and the ventilation module 16*a* are connected to one another in a mechanically stable manner.

The ventilation module 16*a* also comprises a further counter-mounting surface 44*a*. The counter-mounting surface 44*a* faces into the width direction W. In the representation of FIGS. 1 to 3, the counter-mounting surface 44*a* faces to the right.

The counter-mounting surface 44*a* comprises a counter-connection feature 46*a* and a counter-positioning feature 48*a*.

The counter-mounting surface 38*a* and the further counter-mounting surface 44*a* are arranged on opposite sides of the ventilation module 16*a*.

In an assembled state of the dashboard assembly 10, the ventilation module 16*a*, more precisely the second counter-mounting surface 44*a*, abuts against the body-sided mounting surface 26*a* of the dashboard body 12.

Moreover, the ventilation module 16*a* and the dashboard body 12 are mechanically connected via the body-sided connection feature 28*a* and the counter-connection feature 46*a*. More precisely, the body-sided connection feature 28*a* and the counter-connection feature 46*a* engage each other.

In the example shown in the Figures, the body-sided connection feature 28*a* is formed as a connection opening and the counter-connection feature 46*a* is formed as a connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 48*a* and the body-sided positioning feature 30*a* of the dashboard body 12 engage each other.

In the example shown in the Figures, the positioning feature 30*a* is formed as a positioning opening and the counter-positioning feature 48*a* is formed as a positioning protrusion. It is understood that this is just an example, and any other suitable connection features and suitable counter-connection features could be used.

Consequently, the dashboard body 12 and the ventilation module 16*a* assume a well-defined position relative to one another. Moreover, the dashboard body 12 and the ventilation module 16*a* are connected to one another in a mechanically stable manner.

The ventilation module 16*b* is sandwiched between the side cover part 20*b* and the dashboard body 12.

To this end, a body-sided mounting surface 26*b* with a body-sided connection feature 28*b* and a body-sided positioning feature 30*b* are arranged on the dashboard body 12. The body-sided mounting surface 26*b* faces into the width direction W. In the examples of FIGS. 1 to 3, the body-sided mounting surface 26*b* faces to the right.

Moreover, on the side cover part 20*b*, there is provided a side cover-sided mounting surface 32*b* having a side cover-sided connection feature 34*b* and a side cover-sided positioning feature 36*b*. The side cover-sided mounting surface 32*b* faces into the width direction W. In the Figures, the side cover-sided mounting surface 32*b* of the side cover part 20*b* faces towards the left.

The ventilation module 16*b* comprises a counter-mounting surface 38*b*. The counter-mounting surface 38*b* faces into the width direction W. In the representation of FIGS. 1 to 3, the counter-mounting surface 38*b* faces to the right.

The counter-mounting surface 38*b* comprises a counter-connection feature 40*b* and a counter-positioning feature 42*b*.

In an assembled state of the dashboard assembly 10, the ventilation module 16*b*, more precisely the first counter-mounting surface 38*b*, abuts against the side cover-sided mounting surface 32*b* of the side cover part 20*b*.

Moreover, the ventilation modules 16*b* and the side cover part 20*b* are mechanically connected via the side cover-sided connection feature 34*b* and the counter-connection feature 40*b*. More precisely, the side cover-sided connection feature 34*b* and the counter-connection feature 40*b* engage each other.

In the example shown in the Figures, the side cover-sided connection feature 34*b* is formed as a connection opening and the counter-connection feature 40*b* is formed as a connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 42*b* and the side cover-sided positioning feature 36*b* of the side cover part 20*b* engage each other.

In the example shown in the Figures, the positioning feature 36*b* is formed as a positioning opening and the counter-positioning feature 42*b* is formed as a positioning protrusion. It is understood that this is just an example, and any other suitable connection features and suitable counter-connection features could be used.

Consequently, the side cover part 20*b* and the ventilation module 16*b* assume a well-defined position relative to one another. Moreover, the side cover part 20*b* and the ventilation module 16*b* are connected to one another in a mechanically stable manner.

The ventilation module 16*b* also comprises a further counter-mounting surface 44*b*. The counter-mounting surface 44*b* faces into the width direction W. In the representation of FIGS. 1 to 3, the counter-mounting surface 44*b* faces to the left.

The counter-mounting surface 44*b* comprises a counter-connection feature 46*b* and a counter-positioning feature 48*b*.

The counter-mounting surface 38*b* and the further counter-mounting surface 44*b* are arranged on opposite sides of the ventilation module 16*b*.

In an assembled state of the dashboard assembly 10, the ventilation module 16*b*, more precisely the second counter-mounting surface 44*b*, abuts against the body-sided mounting surface 26*b* of the dashboard body 12.

Moreover, the ventilation module 16*b* and the dashboard body 12 are mechanically connected via the body-sided connection feature 28*b* and the counter-connection feature 46*b*. More precisely, the body-sided connection feature 28*b* and the counter-connection feature 46*b* engage each other.

In the example shown in the Figures, the body-sided connection feature 28*b* is formed as a connection opening and the counter-connection feature 46*b* is formed as a connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 48*b* and the body-sided positioning feature 30*b* of the dashboard body 12 engage each other.

In the example shown in the Figures, the positioning feature 30*b* is formed as a positioning opening and the counter-positioning feature 48*b* is formed as a positioning protrusion. It is understood that this is just an example, and any other suitable connection features and suitable counter-connection features could be used.

Consequently, the dashboard body 12 and the ventilation module 16*b* assume a well-defined position relative to one another. Moreover, the dashboard body 12 and the ventilation module 16*b* are connected to one another in a mechanically stable manner.

The ventilation module 16*c* is sandwiched between the dashboard body 12 and the central cover part 22.

To this end, a body-sided mounting surface 26*c* with a body-sided connection feature 28*c* and a body-sided positioning feature 30*c* are arranged on the dashboard body 12. The body-sided mounting surface 26*c* faces into the width direction W. In the examples of FIGS. 1 to 3, the body-sided mounting surface 26*c* faces to the right.

Moreover, on the central cover part 22, there is provided a central cover-sided mounting surface 50*a* having a central cover-sided connection feature 52*a* and a central cover-sided positioning feature 54*a*. The central cover-sided mounting surface 50*a* faces into the width direction W. In the Figures, the central cover-sided mounting surface 50*a* of the central cover part 22 faces towards the left.

The ventilation module 16*c* comprises a counter-mounting surface 38*c*. The counter-mounting surface 38*c* faces into the width direction W. In the representation of FIGS. 1 to 3, the counter-mounting surface 38*c* faces to the left.

The counter-mounting surface 38*c* comprises a counter-connection feature 40*c* and a counter-positioning feature 42*c*.

In an assembled state of the dashboard assembly 10, the ventilation module 16*c*, more precisely the counter-mounting surface 38*c*, abuts against the body-sided mounting surface 26*c* of the dashboard body 12.

Moreover, the ventilation module 16*c* and the dashboard body 12 are mechanically connected via the body-sided connection feature 28*c* and the counter-connection feature 40*c*. More precisely, the body-sided connection feature 28*c* and the counter-connection feature 40*c* engage each other.

In the example shown in the Figures, the body-sided connection feature 28*c* is formed as a connection opening and the counter-connection feature 40*c* is formed as an elastic connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 42*c* and the body-sided positioning feature 30*c* of the dashboard body 12 engage each other.

In the example shown in the Figures, the positioning feature 30*c* is formed as a positioning opening and the counter-positioning feature 42*c* is formed as a positioning protrusion. It is understood that this is just an example, and any other suitable connection features and suitable counter-connection features could be used.

Consequently, the dashboard body 12 and the ventilation module 16*c* assume a well-defined position relative to one another. Moreover, the dashboard body 12 and the ventilation module 16*c* are connected to one another in a mechanically stable manner.

The ventilation module 16*c* also comprises a further counter-mounting surface 44*c*. The counter-mounting surface 44*c* faces into the width direction W. In the representation of FIGS. 1 to 3, the counter-mounting surface 44*c* faces to the right.

The counter-mounting surface 44*c* comprises a counter-connection feature 46*c* and a counter-positioning feature 48*c*.

The counter-mounting surface 38*c* and the further counter-mounting surface 44*c* are arranged on opposite sides of the ventilation module 16*c*.

In an assembled state of the dashboard assembly 10, the ventilation module 16*c*, more precisely the second counter-mounting surface 44*c*, abuts against the central cover-sided mounting surface 50*a* of the central cover part 22.

Moreover, the ventilation modules 16*c* and the central cover part 22 are mechanically connected via the central cover-sided connection feature 52*a* and the counter-connection feature 46*c*. More precisely, the central cover-sided connection feature 52*a* and the counter-connection feature 46*c* engage each other.

In the example shown in the Figures, the central cover-sided connection feature 52*a* is formed as a connection opening and the counter-connection feature 46*c* is formed as an elastic connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 48*c* and the central cover-sided positioning feature 54*a* of the cover part 22 engage each other.

In the example shown in the Figures, the positioning feature 54*a* is formed as a positioning opening and the counter-positioning feature 48*c* is formed as a positioning protrusion. It is understood that this is just an example, and any other suitable connection features and suitable counter-connection features could be used.

Consequently, the central cover part 22 and the ventilation module 16*c* assume a well-defined position relative to one another. Moreover, the central cover part 22 and the ventilation module 16*c* are connected to one another in a mechanically stable manner.

The ventilation module 16*d* is sandwiched between the dashboard body 12 and the central cover part 22.

To this end, a body-sided mounting surface 26*d* with a body-sided connection feature 28*d* and a body-sided positioning feature 30*d* are arranged on the dashboard body 12. The body-sided mounting surface 26*d* faces into the width direction W. In the examples of FIGS. 1 to 3, the body-sided mounting surface 26*d* faces to the left.

Moreover, on the central cover part 22, there is provided a central cover-sided mounting surface 50*b* having a central cover-sided connection feature 52*b* and a central cover-sided positioning feature 54*b*. The central cover-sided mounting surface 50*b* faces into the width direction W. In the Figures, the central cover-sided mounting surface 50*b* of the central cover part 22 faces towards the right.

The ventilation module 16*d* comprises a counter-mounting surface 38*d*. The counter-mounting surface 38*d* faces into the width direction W. In the representation of FIGS. 1 to 3, the counter-mounting surface 38*d* faces to the right.

The counter-mounting surface 38*d* comprises a counter-connection feature 40*d* and a counter-positioning feature 42*d*.

In an assembled state of the dashboard assembly 10, the ventilation module 16*d*, more precisely the counter-mounting surface 38*d*, abuts against the body-sided mounting surface 26*d* of the dashboard body 12.

Moreover, the ventilation modules 16*d* and the dashboard body 12 are mechanically connected via the body-sided connection feature 28*d* and the counter-connection feature 40*d*. More precisely, the body-sided connection feature 28*d* and the counter-connection feature 40*d* engage each other.

In the example shown in the Figures, the body-sided connection feature 28*d* is formed as a connection opening and the counter-connection feature 40*d* is formed as an elastic connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 42*d* and the body-sided positioning feature 30*d* of the dashboard body 12 engage each other.

In the example shown in the Figures, the positioning feature 30*d* is formed as a positioning opening and the counter-positioning feature 42*d* is formed as a positioning protrusion. It is understood that this is just an example, and any other suitable connection features and suitable counter-connection features could be used.

Consequently, the dashboard body 12 and the ventilation module 16*d* assume a well-defined position relative to one another. Moreover, the dashboard body 12 and the ventilation module 16*d* are connected to one another in a mechanically stable manner.

The ventilation module 16*d* also comprises a further counter-mounting surface 44*d*. The counter-mounting surface 44*d* faces into the width direction W. In the representation of FIGS. 1 to 3, the counter-mounting surface 44*d* faces to the left.

The counter-mounting surface 44*d* comprises a counter-connection feature 46*d* and a counter-positioning feature 48*d*.

The counter-mounting surface 38*d* and the further counter-mounting surface 44*d* are arranged on opposite sides of the ventilation module 16*d*.

In an assembled state of the dashboard assembly 10, the ventilation module 16*d*, more precisely the second counter-mounting surface 44*d*, abuts against the central cover-sided mounting surface 50*b* of the central cover part 22.

Moreover, the ventilation modules 16*d* and the central cover part 22 are mechanically connected via the central cover-sided connection feature 52*b* and the counter-connection feature 46*d*. More precisely, the central cover-sided connection feature 52*b* and the counter-connection feature 46*d* engage each other.

In the example shown in the Figures, the central cover-sided connection feature 52*b* is formed as a connection opening and the counter-connection feature 46*d* is formed as an elastic connection hook. The connection hook is configured to engage the connection opening. Of course, kinematically inverting the connection opening and the connection hook is also possible. It is understood that this is just an example, and any other suitable connection features and suitable counter-connection features could be used, e.g., a threaded bolt and a corresponding nut, a gluing surface with glue and a counter-gluing surface or a welding zone and a counter-welding zone.

Furthermore, the counter-positioning feature 48*d* and the central cover-sided positioning feature 54*b* of the cover part 22 engage each other.

In the example shown in the Figures, the positioning feature 54*b* is formed as a positioning opening and the counter-positioning feature 48*d* is formed as a positioning protrusion. It is understood that this is just an example, and any other suitable connection features and suitable counter-connection features could be used.

Consequently, the central cover part 22 and the ventilation module 16*d* assume a well-defined position relative to one another. Moreover, the central cover part 22 and the ventilation module 16*d* are connected to one another in a mechanically stable manner.

Beyond that, side cover part 20*a* comprises a bezel portion 56*a* and side cover part 20*b* comprises a bezel portion 56*b*. In a mounted state of the dashboard assembly, the bezel portions 56*a*, 56*b* are located adjacent to the ventilation modules 16*a*, 16*b* (cf. FIGS. 1 and 2).

Moreover, the dashboard body 12 comprises bezel portions 58*a*, 58*b*. Also, these bezel portions 58*a*, 58*b* are located adjacent to the ventilation modules 16*a*, 16*b* respectively, if the dashboard assembly 10 is mounted.

Consequently, ventilation module 16*a*, especially air outlet 18*a* is framed by the bezel portions 56*a*, 58*a*. In the same manner, ventilation module 16*b*, especially air outlet 18*b* is framed by the bezel portions 56*b*, 58*b*.

Additionally, the dashboard body 12 comprises bezel portions 58*c*, 58*d* these bezel portions 58*c*, 58*d* are located adjacent to the ventilation modules 16*c*, 16*d* respectively if the dashboard assembly 10 is mounted.

Furthermore, the central cover part 22 comprises bezel portions 60*a*, 60*b*. In a mounted state of the dashboard assembly 10, the bezel portion 60*a*, 60*b* are located adjacent to the ventilation modules 16*c*, 16*d*, respectively.

Consequently, ventilation module 16*c*, especially air outlet 18*c* is framed by the bezel portions 58*c*, 60*a*. In the same manner, ventilation module 16*d*, especially air outlet 18*d*, is framed by the bezel portions 58*d*, 60*b*.

The dashboard assembly 10 as shown in FIGS. 1 to 3 may be assembled using a method for assembling a dashboard assembly for a vehicle.

In this context, the ventilation module 16*a* is mounted as follows.

In a first step, the ventilation module 16*a* is abutted against the side cover-sided mounting surface 32*a* of the side cover part 20*a*. In doing so, the ventilation modules 16*a* and the side cover part 20*a* are moved relative to one another along the width direction W. Moreover, the ventilation module 16*a* is positioned and connected to the side cover-sided mounting surface 32*a* of the side cover part 20*a* has been explained above.

Subsequently, the sub-assembly comprising the side cover part 20*a* and the ventilation module 16*a* is mounted on the dashboard body 12. To this end, the ventilation module 16*a* is abutted against the body-sided mounting surface of the dashboard body 12. In doing so, the sub-assembly and the dashboard body 12 are moved relative to one another along the width direction W. Additionally, the ventilation module 16*a* is positioned and connected to the body-sided mounting surface 26*a* of the dashboard body 12 as has been explained above.

The ventilation module 16*b* is mounted in a similar manner.

In a first step, the ventilation module 16*b* is abutted against the side cover-sided mounting surface 32*b* of the side cover part 20*b*. In doing so, the ventilation module 16*b* and the side cover part 20*b* are moved relative to one another along the width direction W. Moreover, the ventilation module 16*b* is positioned and connected to the side cover-sided mounting surface 32*b* of the side cover part 20*b* has been explained above.

Subsequently, the sub-assembly comprising the side cover part 20*b* and the ventilation module 16*b* is mounted on the dashboard body 12. To this end, the ventilation module 16*b* is abutted against the body-sided mounting surface 26*b* of the dashboard body 12. In doing so, the sub-assembly and the dashboard body 12 are moved relative to one another along the width direction W. Additionally, the ventilation module 16*b* is positioned and connected to the body-sided mounting surface 26*b* of the dashboard body 12 as has been explained above.

It is noted that it is of course also possible that at least one of the ventilation modules 16*a*, 16*b* is first abutted and connected to the dashboard body 12 and then, the side cover part 20*a* and/or the side cover part 20*b* are abutted and connected to the respective ventilation module 16*a*, 16*b*. Also in this alternative, the main direction of assembly is oriented along with direction W.

Moreover, when executing the method, ventilation modules 16*c*, 16*d* are mounted as follows.

In a first step, ventilation module 16*c* is abutted against the body-sided mounting surface 26*c* of the dashboard body 12. In doing so, the ventilation module 16*c* and the dashboard body 12 are moved relative to one another along the width direction W. Moreover, the ventilation module 16*c* is positioned and connected to the dashboard body 12 as has been explained above.

Additionally, ventilation module 16*d* is abutted against the body-sided mounting surface 26*d* of the dashboard body 12. In doing so, the ventilation module 16*d* and the dashboard body 12 are moved relative to one another along the width direction W. Moreover, the ventilation module 16*d* is positioned and connected to the dashboard body 12 as has been explained above.

Thereafter, the central cover part 22 is arranged between the ventilation module 16*c* and the ventilation module 16*d*. To this end, the central cover part 22 is moved into the space between the ventilation module 16*c* and the ventilation module 16*d* along the height direction H. At the same time, the ventilation module 16*c* and the ventilation module 16*d* are positioned relatively to the central cover part 22 and connected to the central cover part 22 as has been explained above.

In a last step, the screen unit 24 is mounted on the central cover part 22. To this end, the screen unit 24 is moved towards the central cover part 22 essentially along the depth direction D. Thus, the screen unit 24 is used to seal a central portion of the central cover part 22.

According to an embodiment, it is a dashboard assembly for a vehicle, comprising a dashboard body extending at least along a width direction, wherein in a state in which the dashboard body is mounted in the vehicle, the width direction extends in parallel to a width direction of the vehicle, and at least one ventilation module, comprising an air duct ending in an air outlet being configured to discharge air into a passenger compartment of the vehicle, wherein at least one body-sided mounting surface with a body-sided connection feature is arranged on the dashboard body, the body-sided mounting surface facing into the width direction, and wherein the at least one ventilation module abuts against the body-sided mounting surface and is connected to the dashboard body using the body-sided connection feature.

According to an embodiment, it is dashboard body comprising a dashboard assembly, wherein the dashboard body extending at least along a width direction, wherein in a state in which the dashboard body is mounted in the vehicle, the width direction extends in parallel to a width direction of the vehicle, and at least one ventilation module, comprising an air duct ending in an air outlet being configured to discharge air into a passenger compartment of the vehicle, wherein at least one body-sided mounting surface with a body-sided connection feature is arranged on the dashboard body, the body-sided mounting surface facing into the width direction, and wherein the at least one ventilation module abuts against the body-sided mounting surface and is connected to the dashboard body using the body-sided connection feature.

According to an embodiment, it is a ventilation module comprising, an air duct ending in an air outlet configured to discharge air into a passenger compartment of the vehicle, and at least one counter-mounting surface with a counter-connection feature, the counter-mounting surface configured to abut against a mounting surface of one or more of a dashboard body, a side cover part, and a central cover part and the counter-connection feature configured to engage a connection feature of one or more of the mounting surface of the dashboard body, the side cover part, and the central cover part; and wherein the ventilation module is configured as a component of a dashboard assembly. The ventilation module further comprises two counter-mounting surfaces, each having a counter-connection feature, the counter-mounting surfaces arranged on opposite sides of the ventilation module.

A side cover part comprising at least one side cover-sided mounting surface with a side cover-sided connection feature, the side cover-sided mounting surface facing into a width direction when the side cover part is mounted in a dashboard assembly.

A central cover part comprising at least one central cover-sided mounting surface (with a central cover-sided connection feature, the central cover-sided mounting surface facing into a width direction when the central cover part is mounted in a dashboard assembly.

According to an embodiment, it is a method for assembling a dashboard assembly for a vehicle, comprising abutting a ventilation module against one or more of a body-sided mounting surface of a dashboard body, and a side cover-sided mounting surface of a side cover part by moving one or more of the ventilation module, the dashboard body, and side cover part relative to one another along a width direction, and connecting the ventilation module to one or more of the body-sided mounting surface of the dashboard body and to the side cover-sided mounting surface of the side cover part using a connection feature.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS

10 dashboard assembly
12 dashboard body
14 reception channel
16*a* ventilation module
16*b* ventilation module
16*c* ventilation module
16*d* ventilation module
18*a* air outlet
18*b* air outlet
18*c* air outlet
18*d* air outlet
20*a* side cover part
20*b* side cover part
22 central cover part
24 screen unit
26*a* body-sided mounting surface
26*b* body-sided mounting surface

26*c* body-sided mounting surface
26*d* body-sided mounting surface
28*a* body-sided connection feature
28*b* body-sided connection feature
28*c* body-sided connection feature
28*d* body-sided connection feature
30*a* body-sided positioning feature
30*b* body-sided positioning feature
30*c* body-sided positioning feature
30*d* body-sided positioning feature
32*a* side cover-sided mounting surface
32*b* side cover-sided mounting surface
34*a* side cover-sided connection feature
34*b* side cover-sided connection feature
36*a* side cover-sided positioning feature
36*b* side cover-sided positioning feature
38*a* counter-mounting surface
38*b* counter-mounting surface
38*c* counter-mounting surface
38*d* counter-mounting surface
40*a* counter-connection feature
40*b* counter-connection feature
40*c* counter-connection feature
40*d* counter-connection feature
42*a* counter-positioning feature
42*b* counter-positioning feature
42*c* counter-positioning feature
42*d* counter-positioning feature
44*a* counter-mounting surface
44*b* counter-mounting surface
44*c* counter-mounting surface
44*d* counter-mounting surface
46*a* counter-connection feature
46*b* counter-connection feature
46*c* counter-connection feature
46*d* counter-connection feature
48*a* counter-positioning feature
48*b* counter-positioning feature
48*c* counter-positioning feature
48*d* counter-positioning feature
50*a* central cover-sided mounting surface
50*b* central cover-sided mounting surface
52*a* central cover-sided connection feature
52*b* central cover-sided connection feature
54*a* central cover-sided positioning feature
54*b* central cover-sided positioning feature
56*a* bezel portion
56*b* bezel portion
58*a* bezel portion
58*b* bezel portion
58*c* bezel portion
58*d* bezel portion
60*a* bezel portion
60*b* bezel portion
W width direction
H height direction
D depth direction

What is claimed is:

1. A dashboard assembly for a vehicle, comprising:

a dashboard body extending at least along a width direction, wherein in a state in which the dashboard body is mounted in the vehicle, the width direction extends in parallel to a width direction of the vehicle, and at least one ventilation module, comprising an air duct ending in an air outlet configured to discharge air into a passenger compartment of the vehicle, wherein at least one body-sided mounting surface with a body-sided connection feature is arranged on the dashboard body, the body-sided mounting surface facing into the width direction, and wherein the at least one ventilation module abuts against the body-sided mounting surface and is connected to the dashboard body using the body-sided connection feature, and wherein at least one of:

(i) a side cover part is arranged at an end of the dashboard body in the width direction, the side cover part comprising at least one side cover-sided mounting surface with a side cover-sided connection feature facing into the width direction, wherein the at least one ventilation module abuts against the side cover-sided mounting surface and is connected to the side cover part using the side cover-sided connection feature; or (ii) a central cover part is arranged between ends of the dashboard body in the width direction, the central cover part comprising at least one central cover-sided mounting surface with a central cover-sided connection feature facing into the width direction, wherein the at least one ventilation module abuts against the central cover-sided mounting surface and is connected to the central cover part using the central cover-sided connection feature.

2. The dashboard assembly of claim 1, wherein the body-sided mounting surface comprises a body-sided positioning feature and wherein the ventilation module engages the body-sided positioning feature.

3. The dashboard assembly of claim 1, wherein the dashboard body comprises a bezel portion located adjacent to the ventilation module.

4. The dashboard assembly of claim 1, wherein the side cover-sided mounting surface comprises a side cover-sided positioning feature and wherein the ventilation module engages the side cover-sided positioning feature.

5. The dashboard assembly of claim 1, wherein the side cover part comprises a bezel portion located adjacent to the ventilation module.

6. The dashboard assembly of claim 1, wherein the central cover-sided mounting surface comprises a central cover-sided positioning feature and wherein the ventilation module engages the central cover-sided positioning feature.

7. The dashboard assembly of claim 1, wherein the central cover part comprises a bezel portion located adjacent to the ventilation module.

8. The dashboard assembly of claim 1, wherein the central cover part is configured to receive a screen unit, wherein the screen unit forms part of an infotainment system.

9. The dashboard assembly of claim 1, wherein the ventilation module comprises at least one counter-mounting surface with a counter-connection feature, wherein the counter-mounting surface is configured to abut against a mounting surface of one or more of the dashboard body, the side cover part, and the central cover part.

10. The dashboard assembly of claim 9, wherein the counter-connection feature is configured to engage a connection feature of the mounting surface of one or more of the dashboard body, the side cover part, and the central cover part.

11. The dashboard assembly of claim 1, wherein the ventilation module comprises two counter-mounting surfaces, each having a counter-connection feature, the counter-mounting surfaces arranged on opposite sides of the ventilation module.

12. The dashboard assembly of claim 1, wherein the dashboard assembly comprises the side cover part, wherein the side cover part comprises at least one side cover-sided mounting surface with a side cover-sided connection feature, the side cover-sided mounting surface facing into the width direction when the side cover part is mounted in the dashboard assembly.

13. The dashboard assembly of claim 1, wherein the dashboard assembly comprises the central cover part, wherein the central cover part comprises at least one central cover-sided mounting surface with a central cover-sided connection feature, the central cover-sided mounting surface facing into the width direction when the central cover part is mounted in the dashboard assembly.

14. The dashboard assembly of claim 1, wherein the body-sided connection feature is formed as a connection opening and configured to receive a counter-connection feature formed on a receiving side as an elastic connection hook, wherein one or more of the body-sided connection features, the side cover-sided connection feature, the central cover-sided connection feature, and the corresponding counter-connection features comprise one of a threaded bolt and a corresponding nut, a gluing surface with glue and a counter-gluing surface, and a welding zone and a counter-welding zone.

15. A method for assembling a dashboard assembly for vehicle, comprising:

abutting a ventilation module against a body-sided mounting surface of a dashboard body or a side cover-sided mounting surface of a side cover part by moving the ventilation module and the dashboard body or side cover part relative to one another along a width direction;

connecting the ventilation module to the body-sided mounting surface of the dashboard body or to the side cover-sided mounting surface of the side cover part using a connection feature; and providing a central cover part arranged between ends of the dashboard body in the width direction, the central cover part having at least one central cover-sided mounting surface with a central cover-sided connection feature, the central cover-sided mounting surface facing into the width direction, wherein the ventilation module abuts against the central cover-sided mounting surface and is connected to the central cover part using the central cover-sided connection feature.

16. A ventilation module for a dashboard assembly the ventilation module comprising:

an air duct ending in an air outlet configured to discharge air into a passenger compartment of a vehicle; and at least one counter-mounting surface with a counter-connection feature, the counter-mounting surface configured to abut against a mounting surface of one or more of a dashboard body, a side cover part, and a central cover part and the counter-connection feature configured to engage a connection feature of one or more of the mounting surface of the dashboard body, the side cover part, and the central cover part; and wherein the ventilation module is configured as a component of the dashboard assembly; and wherein the dashboard assembly in which the ventilation module is installed comprises at least one of the side cover part, wherein the side cover part comprises at least one side cover-sided mounting surface with a side cover-sided connection feature, the side cover-sided mounting surface facing into a width direction when the side cover part is mounted in the dashboard assembly; or the central co part, wherein the central cover part comprises at least one central cover-sided mounting surface with a central cover-sided connection feature the central cover-sided mounting surface facing into the width direction when the central cover part is mounted in the dashboard assembly.

* * * * *